(12) United States Patent
Delaney, Jr. et al.

(10) Patent No.: US 11,326,022 B2
(45) Date of Patent: May 10, 2022

(54) MULTI-ARMED POLYMERS COMPRISING FREE-RADICAL-POLYMERIZABLE MONOMERS AND COMPOSITIONS, SYSTEMS AND METHODS PERTAINING TO THE SAME

(71) Applicant: Boston Scientific Scimed Inc., Maple Grove, MN (US)

(72) Inventors: Joseph T. Delaney, Jr., Minneapolis, MN (US); Carey Rehder, Inver Grove Heights, MN (US); Tatyana Dyndikova, Minneapolis, MN (US); John Kummailil, Sherborn, MA (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 0 days.

(21) Appl. No.: 16/999,809

(22) Filed: Aug. 21, 2020

(65) Prior Publication Data
US 2021/0061950 A1 Mar. 4, 2021

Related U.S. Application Data

(60) Provisional application No. 62/892,786, filed on Aug. 28, 2019.

(51) Int. Cl.
*C08G 63/00* (2006.01)
*C08G 63/91* (2006.01)
(Continued)

(52) U.S. Cl.
CPC ....... *C08G 63/916* (2013.01); *C08G 73/0206* (2013.01); *C08K 5/0025* (2013.01); *C08G 2210/00* (2013.01); *C08G 2230/00* (2013.01)

(58) Field of Classification Search
CPC ............ C08G 63/916; C08G 73/0206; C08G 2210/00; C08G 2230/00; C08G 83/00;
(Continued)

(56) References Cited

U.S. PATENT DOCUMENTS

| | | | |
|---|---|---|---|
| 6,420,479 B1 * | 7/2002 | Phan | ............... C08F 2/24 524/501 |
| 6,818,018 B1 | 11/2004 | Sawhney | |

(Continued)

OTHER PUBLICATIONS

"Augmenix Announces Positive Three-year SpaceOAR Clinical Trial Results," Imaging Technology News, Oct. 27, 2016.
(Continued)

*Primary Examiner* — Robert C Boyle
(74) *Attorney, Agent, or Firm* — Seager, Tufte & Wickhem, LLP

(57) ABSTRACT

In some aspects, the present disclosure pertains to multi-arm polymers that comprise a core, a plurality of polymer segments having a first end that is covalently attached to the core and a second end comprising a moiety that comprises a reactive group, wherein the polymer segments comprise one or more free-radical-polymerizable monomers. In some aspects, systems are provided that comprise a first composition comprising such a multi-arm polymer and a second composition comprising a multifunctional compound that comprises functional groups that are reactive with the reactive groups of the multi-arm polymer. In some aspects, systems are provided that comprise crosslinked reaction products of such a multi-arm polymer and such a multifunctional compound.

17 Claims, 2 Drawing Sheets

(51) Int. Cl.
*C08G 73/02* (2006.01)
*C08K 5/00* (2006.01)

(58) Field of Classification Search
CPC . C08K 5/0025; C08F 8/14; C08F 8/00; C08F 2438/03; C08F 2/38; C08J 2477/04; C08J 2339/06; C08J 2300/202; C08J 3/075; C08J 3/24; C08L 39/06
See application file for complete search history.

(56) References Cited

U.S. PATENT DOCUMENTS

| | | | | |
|---|---|---|---|---|
| 7,744,861 | B2* | 6/2010 | Zhao | A61K 47/59 424/78.17 |
| 8,383,161 | B2 | 2/2013 | Campbell et al. | |
| 9,732,169 | B2 | 8/2017 | Wang et al. | |
| 2011/0142936 | A1* | 6/2011 | Campbell | A61K 49/0442 424/484 |
| 2011/0200550 | A1* | 8/2011 | Kozlowski | A61K 31/4745 424/78.17 |
| 2014/0242024 | A1 | 8/2014 | Bennett et al. | |
| 2019/0038454 | A1 | 2/2019 | Eisenfrats et al. | |

OTHER PUBLICATIONS

"Augmenix Receives FDA Clearance to Market its TraceIT™ Tissue Marker," BusinessWire Jan. 28, 2013.
McDowall, L., Chen, G. and Stenzel, M.H. (2008), Synthesis of Seven-Arm Poly(vinyl pyrrolidone) Star Polymers with Lysozyme Core Prepared by MADDIX/RAFT Polymerization. Macromol. Rapid Commun., 29: 1666-1671. https://doi.org/10.1002/marc.200800416.
International Search Report and Written Opinion for the International Patent Application No. PCT/US2020/047431, dated Oct. 21, 2020, 14 pages.
Wei, Z.; Hao, X.; Gan, Z.; Hughes, T. C., One-pot synthesis of hyperbranched glycopolymers by RAFT polymerization. Journal of Polymer Science Part A: Polymer Chemistry 2012, 50 (12), 2378-2388.
Willcock, H.; O'Reilly, R. K., End group removal and modification of RAFT polymers Polym. Chem. 2010, 1 (2), 149-157.
Lopez-Perez, P. M.; da Silva, R. M. P.; Strehin, I.; Kouwer, P. H. J.; Leeuwenburgh, S. C. G.; Messersmith, P. B., Self-healing hydrogels formed by complexation between calcium ions and bisphosphonate-functionalized star-shaped polymers. Macromolecules 2017, 50 (21), 8698-8706.

* cited by examiner

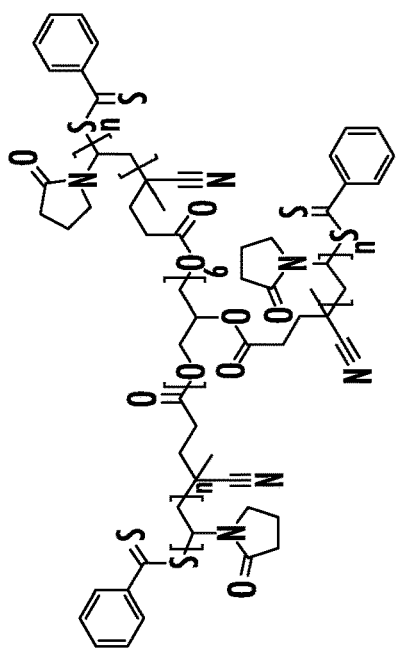
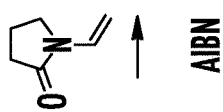
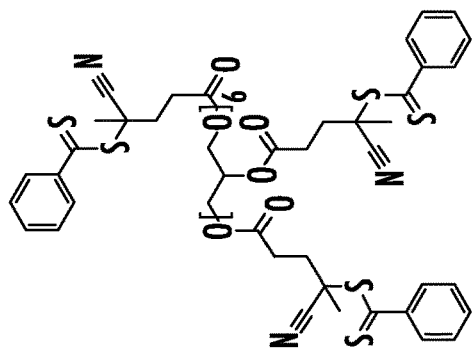
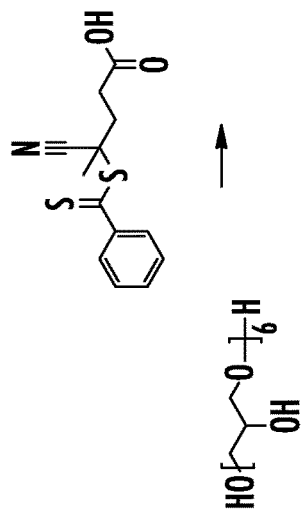
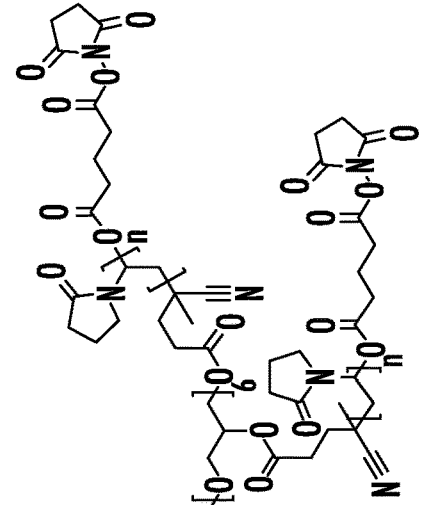
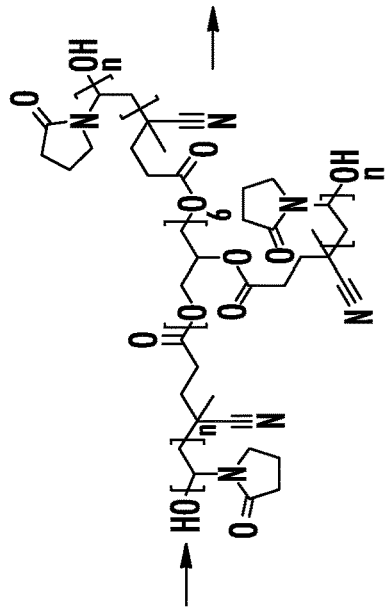
FIG. 3A
FIG. 3B

MULTI-ARMED POLYMERS COMPRISING FREE-RADICAL-POLYMERIZABLE MONOMERS AND COMPOSITIONS, SYSTEMS AND METHODS PERTAINING TO THE SAME

CROSS-REFERENCE TO RELATED APPLICATION

This application claims the benefit of U.S. Provisional Application No. 62/892,786, entitled "MULTI-ARMED POLYMERS COMPRISING FREE-RADICAL-POLYMERIZABLE MONOMERS AND COMPOSITIONS, SYSTEMS AND METHODS PERTAINING TO THE SAME" and filed Aug. 28, 2019, the entire disclosure of which is incorporated herein by reference.

FIELD

The present disclosure relates to multi-armed polymers, compositions containing the multi-armed polymers, methods of making multi-armed polymers, and methods of using multi-armed polymers, among other aspects. The multi-armed polymers of the present disclosure are useful, for example, in various biomedical applications.

BACKGROUND

Bioerodible injectable hydrogels are a newly emerging class of materials having a variety of medical uses.

As one specific example, in the case of SpaceOAR®, a long-term bioerodible injectable hydrogel based on multi-arm PEG-based, such products are used to create or maintain space between tissues in order to reduce side effects of off-target radiation therapy. See "Augmenix Announces Positive Three-year SpaceOAR Clinical Trial Results," *Imaging Technology News*, Oct. 27, 2016. As another specific example, Augmenix has developed TraceIT® Hydrogel, a bioerodible injectable hydrogel synthetic hydrogel consisting primarily of water and iodinated cross-linked polyethylene glycol (PEG) that is visible under CT, cone beam, ultrasound and MR imaging and is useful as a tissue marker (e.g., for targeted radiation therapy). See "Augmenix Receives FDA Clearance to Market its TraceIT™ Tissue Marker," *BusinessWire* Jan. 28, 2013. TraceIT® hydrogel remains stable and visible in tissue for three months, long enough for radiotherapy, after which it is absorbed and cleared from the body. Id.

There is a continuing need in the biomedical arts for additional hydrogels, including bioerodible injectable hydrogels, for precursors of such hydrogels, for methods of making such hydrogels and precursors, for methods of using such hydrogels and precursors, and for systems for forming such hydrogels, among other needs.

SUMMARY

In some aspects, the present disclosure pertains to multi-arm polymers that comprise a core, a plurality of polymer segments having a first end that is covalently attached to the core and a second end comprising a moiety that comprises a reactive group, wherein the polymer segments comprise one or more free-radical-polymerizable monomers.

In some embodiments, the polymer segments comprise one or more hydrophilic aprotic monomers. For example, the polymer segments may comprise one or more monomers selected from N-vinyl pyrrolidone, hydroxyethyl acrylate, hydroxyethyl methacrylate, PEG methyl ether acrylate and PEG methyl ether methacrylate, among many others.

In some embodiments, which can used in conjunction with the above aspects and embodiments, the core of the multi-arm polymers may be a polyol residue core.

In some embodiments, which can used in conjunction with the above aspects and embodiments, the reactive groups are electrophiles. For example, the reactive groups may be selected from N-hydroxysuccinimide esters, imidazole esters, imidazole carboxylates and benzotriazole esters, among other possibilities.

In some embodiments, which can used in conjunction with the above aspects and embodiments, the reactive groups may be nucleophiles. For example, the reactive groups may be amine groups or thiol groups, among other possibilities.

In some embodiments, which can used in conjunction with the above aspects and embodiments, the moiety that comprises a reactive group may further comprise a hydrolysable ester group.

In some embodiments, which can used in conjunction with the above aspects and embodiments, the moiety that comprises a reactive group may comprise a diester. For example, the diester may be selected from a malonic-acid-based diester, a succinic-acid-based diester, a glutaric-acid-based diester and an adipic-acid-based diester, among others.

In other aspects, systems are provided that comprise (a) a first composition comprising a multi-arm polymer in accordance with the above aspects and embodiments and (b) a second composition comprising a multifunctional compound that comprises functional groups that are reactive with the reactive groups of the multi-arm polymer.

In some embodiments, the reactive groups of the multi-arm polymer may be selected from one of electrophilic groups and nucleophilic groups and the functional groups of the multifunctional compound may be selected from the other of the electrophilic groups and the nucleophilic groups. For instance, in certain embodiments, the reactive groups may be electrophilic groups, for example, N-hydroxysuccinimide ester groups, among many others, and the functional groups may be nucleophilic groups, for example, amine groups or thiol groups, among many others.

In some embodiments, which can used in conjunction with the above aspects and embodiments, the second composition comprises a polyamine.

In some embodiments, which can used in conjunction with the above aspects and embodiments, the polyamine comprises three or more amine groups.

In some embodiments, which can used in conjunction with the above aspects and embodiments, the system may further comprise a delivery device. For example, the delivery device may comprises a first reservoir containing the first composition and a second reservoir containing the second composition.

In still other aspects, the present disclosure provides crosslinked reaction products of (a) a multi-arm polymer in accordance with the above aspects and embodiments and (b) a multifunctional compound in accordance with the above aspects and embodiments.

In addition to the above, further aspects and embodiments of the present disclosure will become readily apparent upon review of the Detailed Description to follow.

BRIEF DESCRIPTION OF THE DRAWINGS

FIG. 3A is a schematic illustration of a method of forming a multi-arm poly(vinyl pyrrolidone) polymer having terminal RAFT polymerization groups, in accordance with an embodiment of the present disclosure.

FIG. 3B is a schematic illustration of a method of forming a multi-arm poly(vinyl pyrrolidone) terminated with reactive succinimidyl glutarate groups, in accordance with an embodiment of the present disclosure.

DETAILED DESCRIPTION

Figure 1:
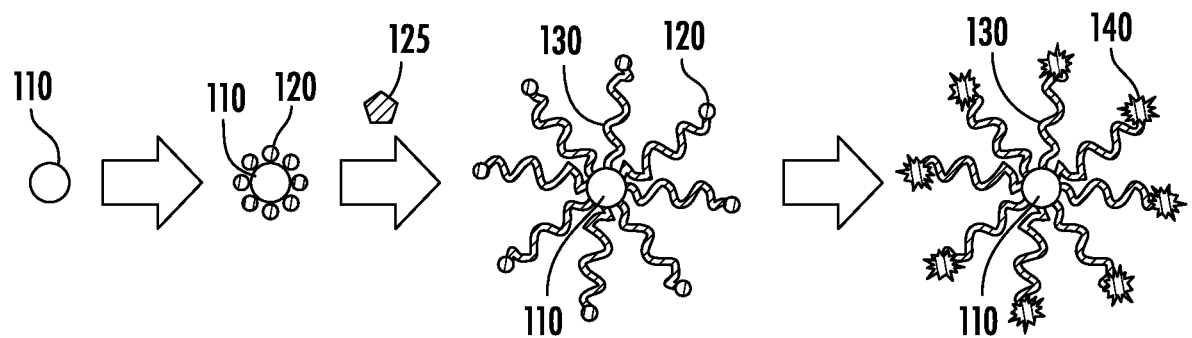
FIG. 1 is a schematic illustration of a method of making a reactive multi-arm polymer, in accordance with an embodiment of the present disclosure.

In various aspects, the present disclosure pertains to methods in which polymerization of at least one type of unsaturated, free-radical-polymerizable monomer proceeds from a suitable multifunctional initiator molecule.

Unsaturated free-radical-polymerizable monomers for use in the present disclosure may be selected from the following unsaturated monomers, among others: (a) vinyl monomers, including vinyl pyrrolidone, vinyl alcohol, halogenated vinyl compounds such as vinyl chloride and vinyl fluoride, vinyl imidazole, vinyl ethers, vinyl esters such as vinyl acetate, acrylonitrile, and vinyl aromatic monomers such as substituted and unsubstituted styrene, (b) alkylene monomers and derivatives, such as ethylene, propylenes (e.g., α-propylene, isopropylene), butylenes (e.g., α-butylene, β-butylene, isobutylene), pentenes, etc., (c) fluorinated unsaturated monomers including fluorinated alkylene monomers (e.g., tetrafluoroethylene, trifluorochloroethylene, vinylidene fluoride, etc.), (d) (meth)acrylic monomers and derivatives, such as acrylic acid, methacrylic acid, methyl acrylate, methyl methacrylate, ethyl acrylate, ethyl methacrylate, butyl acrylate, butyl methacrylate, hydroxyethyl acrylate, hydroxyethyl methacrylate, glyceryl acrylate, glyceryl methacrylate, dimethylaminoethyl acrylate, dimethylaminoethyl methacrylate, PEG acrylates and PEG methacrylates, for example, PEG methyl ether acrylate and PEG methyl ether methacrylate, acrylamide, methacrylamide, ethacrylamide, and so forth, (e) nitriles including acrylonitrile, and methacrylonitrile, and (f) diene monomers such as 1,3-butadiene, chloroprene, and isoprene, as well as combinations of the foregoing monomers.

In particular embodiments, the unsaturated free-radical-polymerizable monomers are selected from monomers which are hydrophilic, aprotic, biologically well-tolerated and can be polymerized via a living polymerization reaction mechanism, which allows for controlled polymer architecture. Specific examples of such unsaturated free-radical-polymerizable monomers include N-vinyl pyrrolidone, hydroxyethyl acrylate, hydroxyethyl methacrylate, PEG methyl ether acrylate and PEG methyl ether methacrylate, among others.

In various embodiments, reverse-addition fragmentation transfer (RAFT) polymerization of the at least one type of unsaturated free-radical-polymerizable monomer is conducted. In these embodiments, the multifunctional initiator molecule may comprise a multifunctional core having a plurality of reverse-addition fragmentation transfer (RAFT) polymerization groups. Examples of RAFT polymerization groups include thiocarbonylthio groups

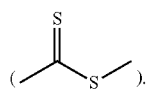

In certain embodiments, the RAFT polymerization groups may comprise dithioester groups, trithiocarbonate groups, dithiocarbonate groups (including O-esters of dithiocarbonate (xanthates) such as ethyl xanthate), dithiocarbamate groups, and dithiobenzoate groups.

In certain embodiments of the disclosure, a multifunctional initiator molecule may be formed by a method comprising coupling a plurality of RAFT polymerization groups to a polyol molecule. For instance, a multifunctional initiator molecule may be formed by a method comprising condensing a polyol with a compound that comprises a carboxyl group and thiocarbonylthio group or reacting a polytosylate and xanthate. Specific examples of such compounds include 4-cyano-4-(phenylcarbonothioylthio)pentanoic acid, 4-cyano-4-[(dodecylsulfanylthiocarbonyl)sulfanyl]pentanoic acid, and 2-(dodecylthiocarbonothioylthio)-2-methylpropionic acid, among others. In other embodiments, RAFT polymerization groups may be coupled to a polyol molecule by, for example, amide coupling, Diels-Alder coupling reactions, and so forth.

Illustrative polyols for use in forming alkoxyamine molecules include, for example, straight-chained, branched and cyclic aliphatic polyols including straight-chained, branched and cyclic polyhydroxyalkanes, straight-chained, branched and cyclic polyhydroxy ethers and polyhydroxy polyethers, straight-chained, and branched and cyclic polyhydroxyalkyl ethers and polyhydroxyalkyl polyethers, straight-chained, branched and cyclic sugars and sugar alcohols, such as glycerol, mannitol, sorbitol, inositol, xylitol, quebrachitol, threitol, arabitol, erythritol, adonitol, dulcitol, fucose, ribose, arabinose, xylose, lyxose, rhamnose, galactose, glucose, fructose, sorbose, mannose, pyranose, altrose, talose, tagatose, pyranosides, sucrose, lactose, or maltose, oligomers (defined herein as ranging from two to ten units, including dimers, trimers, tetramers, pentamers, hexamers, heptamers, octamers, enneamers or decamers) and polymers (defined herein as eleven or more units) of straight-chained, branched and cyclic sugars and sugar alcohols, including the preceding sugars and sugar alcohols, starches, amylose, dextrins, cyclodextrins, polyhydroxy crown ethers, or polyhydroxyalkyl crown ethers, and aromatic polyols including 1,1,1-tris(4'-hydroxyphenyl) alkanes, such as 1,1,1-tris(4-hydroxyphenyl)ethane, and 2,6-bis(hydroxyalkyl)cresols, among others. In certain embodiments, the polyol is an oligomer of a sugar alcohol such as glycerol, mannitol, sorbitol, inositol, xylitol, or erythritol. In certain embodiments, a polyol may be selected which contains two or more hydroxyl groups, for example, between 4 and 12 hydroxyl groups in certain instances.

In some embodiments, polymerization of at least one type of unsaturated, free-radical-polymerizable monomer from a suitable multifunctional initiator molecule may be enhanced by conducting the polymerization in the presence of a radical initiator. Examples of radical initiators include, for example, hydrogen peroxide, organic peroxides such as di-t-butyl peroxide, benzoyl peroxide or methyl ethyl ketone peroxide, among others, and azo compounds such as azobisisobutyronitrile (AIBN), or 1,1'-azo-bis(cyclohexane-carbonitrile) (ABCN), among others.

Using the above and other techniques, a multi-arm polymer (e.g., one having 2, 3, 4, 5, 6, 7, 8, 9, 10 or more arms) with RAFT polymerization end-groups can be formed. Using the above and other techniques, a multi-arm polymer that comprises a core (e.g., a residue of a polyol) and a plurality of polymer segments, each having a first end and a second end, and each formed from polymerization of at least one type of unsaturated free-radical-polymerizable monomer, wherein the first end is linked to the core and the second end is linked to RAFT polymerization group can be formed.

After polymerization, in various embodiments, the RAFT polymerization groups may be removed to form, for example, a hydroxy-terminated multi-armed polymer. In various embodiments, the RAFT polymerization groups may be removed, for example, through nucleophilic substitution.

Although the process described above employs RAFT polymerization, other types of polymerization may be used for forming multi-arm polymers as well. As one example, such multi-arm polymers can be formed by nitroxide-mediated polymerization (NMP) of at least one type of unsaturated free-radical-polymerizable monomer, for instance, wherein the polymerization proceeds from a multifunctional initiator molecule having multiple nitroxide groups as described in copending Ser. No. 62/892,782. As another example, such multi-arm polymers can be formed by atom transfer radical polymerization (ATRP) of at least one type of unsaturated free-radical-polymerizable monomer, for instance, wherein the polymerization proceeds from a multifunctional initiator molecule having multiple alkyl halide groups in the presence of a copper catalyst. Where RAFT is used to form the polymer segments, the polymer products may be identified by a measurable amount of residual sulfur. Where NMP is used to form the polymer segments, the polymer products may be identified by a measurable amount of nitroxide radicals. Where ATRP is used to form the polymer segments, the polymer products may be identified by a measurable amount of copper.

The formation of such multi-arm polymers is shown schematically in FIG. 1, in which a core molecule 110 (e.g., a polyol core, among other possibilities) is used to form a multifunctional initiator molecule having a multiple polymerization groups 120 (e.g., an initiator molecule comprising multiple RAFT polymerization groups, multiple NMP polymerization groups, or multiple ATRP polymerization groups). Subsequently, polymerization of a suitable unsaturated free-radical-polymerizable monomer 125 (e.g., vinyl pyrrolidone, among many others) proceeds from the multifunctional initiator molecule to form a multi-arm polymer that comprises a core 110 (e.g., a polyol residue, among others) and a plurality of polymer segments 130, each having a first end and a second end, wherein the first end is linked to the core 110. In the embodiment shown, the second end of each polymer segment 130 comprises a polymerization group 120 (e.g., a RAFT polymerization group).

In various embodiments, a reactive multi-arm polymer that comprises a core and a plurality of polymer segments, each having a first end and a second end, and each formed from at least one type of unsaturated free-radical-polymerizable monomer may be formed, wherein the first end is linked to the core and the second end comprises a reactive group. For example, as shown schematically in FIG. 1, a reactive group 140 may be provided at the second end of each polymer segment 130. In certain embodiments, the second end comprises a hydrolysable ester group positioned between the reactive group and the polymer segment. As above, where RAFT is used to form the polymer segments, the reactive multi-arm polymer may be identified by a measurable amount of residual sulfur, where NMP is used to form the polymer segments, the reactive multi-arm polymer may be identified by a measurable amount of nitroxide radicals, and where ATRP is used to form the polymer segments, the reactive multi-arm polymer may be identified by a measurable amount of copper.

The reactive groups of the reactive multi-arm polymer may be, for example, electrophilic groups or nucleophilic groups. In certain embodiments, the reactive groups of the reactive multi-arm polymer may be electrophilic groups selected from imidazole esters, imidazole carboxylates, benzotriazole esters, and imide esters, including N-hydroxysuccinimidyl esters. In certain embodiments, the reactive groups of the reactive multi-arm polymer may be nucleophilic groups selected from amine groups and thiol groups.

In particular embodiments, a reactive multi-arm polymer may be formed by reacting (a) a polymer that comprises a core (e.g., a polyol residue, among others) and a plurality of polymer segments, each having a first end and a second end, formed from at least one type of unsaturated free-radical-polymerizable monomer, wherein the first end is linked to the core and the second end comprises a hydroxyl group with (b) a cyclic anhydride (e.g., glutaric anhydride, succinic anhydride, malonic anhydride, etc.) to form a reaction product (c) in the form of a polymer that comprises the core and the plurality of polymer segments, wherein the first end of the polymer segment is linked to the core and the second end comprises moiety that comprises a carboxylic acid group and a hydrolysable ester group positioned between the carboxylic acid group and the polymer segment. Subsequently, the reaction product (c) may be treated with a coupling agent (e.g., a carbodiimide coupling agent such as N,N'-dicyclohexylcarbodiimide (DCC), 1-Ethyl-3-(3-dimethylaminopropyl)carbodiimide (EDC), N-Hydroxybenzotriazole (HOBt), BOP reagent, and/or another coupling agent) and N-hydroxysuccinimide (NHS), to yield a multi-arm polymer comprising succinimidyl end groups, in particular, a multi-arm polymer that comprises the core and the plurality of polymer segments, wherein the first end of the polymer segments is linked to the core and the second end comprises a moiety that comprises a hydrolysable ester group and a succinimide ester group.

In a specific example illustrated schematically in FIG. 3A, hexaglycerol (a polyol having 8 hydroxyl groups) is condensed with 4-cyano-4-(phenylcarbonothioylthio) pentanoic acid to form a multifunctional initiator comprising multiple RAFT polymerization groups. See, e.g., Wei, Z., Hao, X., Gan, Z., Hughes, T. C., "One-pot synthesis of hyperbranched glycopolymers by RAFT polymerization," *Journal of Polymer Science Part A: Polymer Chemistry* 2012, 50 (12), 2378-2388. Subsequently, an unsaturated free-radical-polymerizable monomer (N-vinyl pyrrolidone) is added together with a radical initiator (AIBN), and the mixture allowed to react to form 8-arm PVP in which the PVP segments are terminated with RAFT polymerization groups. Then, as illustrated schematically in FIG. 3B (which is a continuation of FIG. 3A), the thiocarbonothio groups of the 8-arm PVP are removed through nucleophilic substitution and succinimidyl glutarate groups are added using glutaric anhydride and N-hydroxysuccinide as reagents. See, e.g., Willcock, H., O'Reilly, R. K., "End group removal and modification of RAFT polymers," *Polym. Chem.* 2010, 1(2), 149-157 and Lopez-Perez, P. M., da Silva, R. M. P., Strehin, I., Kouwer, P. H. J., Leeuwenburgh, S. C. G.; Messersmith, P. B., "Self-healing hydrogels formed by complexation between calcium ions and bisphosphonate-functionalized star-shaped polymers," *Macromolecules* 2017, 50 (21), 8698-8706.

Reactive multi-arm polymers formed as described above may be water soluble. Moreover, reactive multi-arm polymers formed as described above may be crosslinked with a suitable crosslinking agent, either in vivo or ex vivo, to form a crosslinked hydrogel.

In certain embodiments, the reactive multi-arm polymer may be crosslinked with a multifunctional compound having functional groups that are reactive with the reactive groups of the multi-arm polymer. For example, in some embodiments, the reactive groups of the reactive multi-arm polymer are nucleophilic groups and the functional groups of the multifunctional compound group are electrophilic groups. In some embodiments, the reactive groups of the reactive multi-arm polymer are electrophilic groups and the functional groups of the multifunctional compound are nucleophilic groups. For example, the functional groups of the multifunctional compound may be electrophilic groups selected from imidazole esters, imidazole carboxylates, benzotriazole esters, and imide esters, including N-hydroxysuccinimidyl esters. As another example, the functional groups of the multifunctional compound may be nucleophilic groups selected from amine groups and/or thiol groups.

In some embodiments, the reactive groups of the reactive multi-arm polymer and the functional groups of the multifunctional compound react with one another via an amide coupling reaction.

In various aspects, the present disclosure pertains to a crosslinkable system comprising (a) a first composition comprising a reactive multi-arm polymer like that described above, which comprises a core (e.g., a polyol residue, among others) and a plurality of polymer segments, each having a first end and a second end, and each formed from at least one type of unsaturated free-radical-polymerizable monomer, wherein the first end is linked to the core and the second end comprising a moiety that comprise a reactive group and, optionally, a hydrolysable ester group that is positioned between the reactive group and the polymer segment and (b) a second composition comprising a multifunctional compound like that described above, which comprises functional groups that are reactive with the reactive groups. In some embodiments, the reactive groups of the reactive multi-arm polymer are electrophilic groups and the functional groups of the multifunctional compound are nucleophilic groups. In some embodiments, the reactive groups of the reactive multi-arm polymer and the functional groups of the multifunctional compound react with one another via an amide coupling reaction.

In addition to the reactive multi-arm polymer, the first composition may further comprise, for example, therapeutic agents and/or contrast agents, among other possibilities. In addition to the multifunctional compound, the second composition may further comprise, for example, therapeutic agents and/or contrast agents, among other possibilities.

In various embodiments, the system will include one or more delivery devices for delivering the first and second fluid compositions to a subject. For example, the system may include a delivery device that comprises a first reservoir that contains the first composition (e.g., a first liquid composition comprising the reactive multi-arm polymer, or a first dry composition that comprises the reactive multi-arm polymer compound, to which a suitable fluid such as water for injection, saline, etc. can be added to form a fluid composition) and a second reservoir that contains the second composition (e.g., a second fluid composition comprising the multifunctional compound, or a second dry composition that comprises the multifunctional compound, to which a suitable fluid such as water for injection, saline, etc. can be added to form a fluid composition). During operation, the first and second compositions are dispensed from the first and second reservoirs, whereupon the first and second compositions interact and crosslink with one another to form a hydrogel.

In particular embodiments, the system may include a delivery device that comprises a double-barrel syringe, which includes first barrel having a first barrel outlet, which first barrel contains the first fluid composition, a second barrel having a second barrel outlet, which second barrel contains the second fluid composition, a first plunger that is movable in first barrel, and a second plunger that is movable in second barrel.

In some embodiments, the device may further comprise a mixing section having a first mixing section inlet in fluid communication with the first barrel outlet, a second mixing section inlet in fluid communication with the second barrel outlet, and a mixing section outlet. In some embodiments, the device may further comprise a cannula or catheter tube that is configured to receive the first and second fluid compositions from the first and second barrels. For example, a cannula or catheter tube may be configured to form a fluid connection with an outlet of a mixing section by attaching the cannula or catheter tube to an outlet of the mixing section, for example, via a suitable fluid connector such as a luer connector.

As another example, the catheter may be a multi-lumen catheter that comprise a first lumen and a second lumen, a proximal end of the first lumen configured to form a fluid connection with the first barrel outlet and a proximal end of the second lumen configured to form a fluid connection with the second barrel outlet. In some embodiments, the multi-lumen catheter may comprise a mixing section having a first mixing section inlet in fluid communication with a distal end of the first lumen, a second mixing section inlet in fluid communication with a distal end of the second lumen, and a mixing section outlet.

During operation, when the first and second plungers are depressed, the first and second fluid compositions are dispensed from the first and second barrels, whereupon the first and second fluid compositions interact and crosslink to form a hydrogel, which is administered onto or into tissue of a subject. For example, the first and second fluid compositions may pass from the first and second barrels, into the mixing section via first and second mixing section inlets, whereupon the first and second fluid compositions are mixed to form an admixture, which admixture exits the mixing section via the mixing section outlet. In some embodiments, a cannula or catheter tube is attached to the mixing section outlet, allowing the admixture to be administered to a subject after passing through the cannula or catheter tube.

As another example, the first fluid composition may pass from the first barrel outlet into the first lumen of a multi-lumen catheter and the second fluid composition may pass from the second barrel outlet into the second lumen of the multi-lumen catheter. In some embodiments the first and second fluid compositions may pass from the first and second lumen into a mixing section at a distal end of the multi-lumen catheter via first and second mixing section inlets, respectively, whereupon the first and second fluid compositions are mixed in the mixing section to form an admixture, which admixture exits the mixing section via the mixing section outlet.

In additional aspects, the present disclosure pertains to crosslinked products of (a) a reactive multi-arm polymer like that described above, which comprises a core and a plurality of polymer segments, each having a first end and a second end, and each formed from at least one type of unsaturated free-radical-polymerizable monomer, wherein the first end is linked to the core and the second end comprising a moiety that comprise a reactive group and, optionally, a hydrolysable group that is positioned between the reactive group and the polymer segment and (b) a multifunctional compound like that above, which comprises functional groups that are reactive with the reactive groups. Such crosslinked products may be formed in vivo (e.g., using a delivery device like that described above), or such crosslinked products may be formed ex vivo and subsequently administered to a subject.

In various embodiments, the reaction products of the functional groups of the multifunctional compound with the reactive groups of the reactive multi-arm polymer comprise amide linkages.

In certain beneficial embodiments, the reactive groups of the reactive multi-arm polymers for use in the first compositions of the above systems and devices and for use in forming the above crosslinked products (i.e., crosslinked products of the multi-arm polymers described herein with the multifunctional compounds as described herein), may be selected from imidazolyl esters, benzotriazole esters, imide esters, including N-hydroxysuccinimidyl esters, and imidazolyl carboxylates, among others.

In various embodiments, the multifunctional compound for use in the second compositions of the above systems and devices, and for use in forming the above crosslinked products, may be a polyamine. In general, polyamines suitable for use in the present disclosure include, for example, small molecule polyamines (e.g., containing at least two amine groups, for instance, from 3 to 20 amine groups in certain embodiments), comb polymers having amine side groups, and branched polymers having amine end groups, including dendritic polymers having amine end groups.

Particular examples of multifunctional amines which may be used as the multifunctional compound include trilysine, ethylenetriamine, diethylene triamine, hexamethylenetriiamine, di(heptamethylene) triamine, di(trimethylene) triamine, bis(hexamethylene) triamine, triethylene tetramine, tripropylene tetramine, tetraethylene pentamine, hexamethylene heptamine, pentaethylene hexamine, dimethyl octylamine, dimethyl decylamine, and JEFFAMINE polyetheramines available from Huntsman Corporation, among others. Further particular examples of multifunctional amines include polypeptides including poly(L-lysine), chitosan, and poly(allyl amine), among others.

Figure 2:
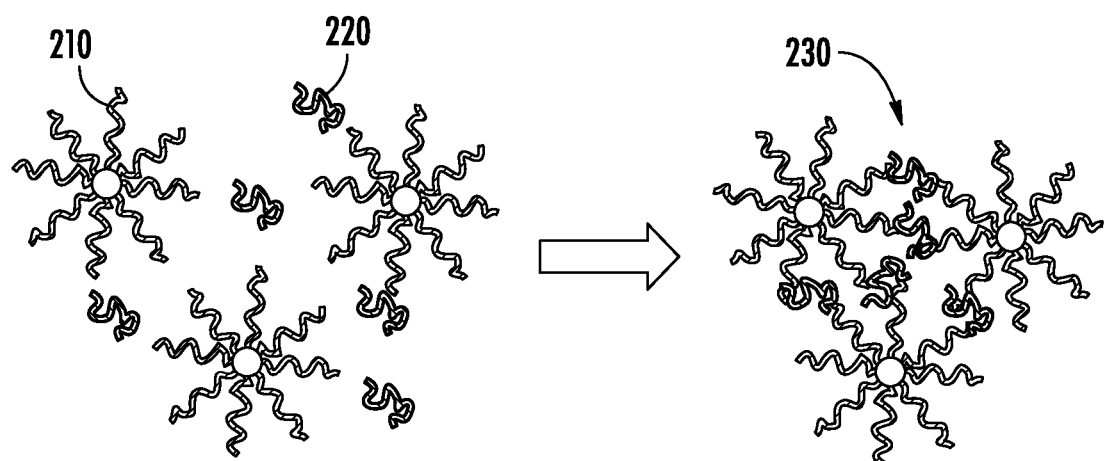
FIG. 2 is a schematic illustration of a method crosslinking a reactive multi-arm polymer with a multifunctional crosslinking agent, in accordance with an embodiment of the present disclosure.

As shown schematically in FIG. 2, a reactive multi-arm polymer 210 like that described above (e.g., comprising a core and a plurality of PVP segments, each PVP segment terminated with a succinimidyl-group) is crosslinked with a multifunctional compound 220 comprising functional groups that are reactive with the reactive groups of the multi-arm polymer 210 (e.g., a polyamine such as trilysine) to form a crosslinked product 230.

Compositions comprising the multi-arm polymers as described herein, as well as compositions comprising the cross-linked polymers described herein (i.e., crosslinked products of the multi-arm polymers described herein with the multifunctional compounds as described herein), can be used in a wide variety of biomedical applications, including medical devices, implants, and pharmaceutical compositions.

In various embodiments, compositions can be formed that include the multi-arm polymers described herein as well as one or more additional agents. In various embodiments, compositions can be formed that include the cross-linked polymers described herein as well as one or more additional agents.

Examples of such additional agents include therapeutic agents and imaging agents, among others.

Examples of imaging agents include (a) fluorescent dyes such as fluorescein, indocyanine green, or fluorescent proteins (e.g. green, blue, cyan fluorescent proteins), (b) contrast agents for use in conjunction with magnetic resonance imaging (MRI), including contrast agents that contain elements that form paramagnetic ions, such as $Gd^{(III)}$, $Mn^{(II)}$, $Fe^{(III)}$ and compounds (including chelates) containing the same, such as gadolinium ion chelated with diethylenetriaminepentaacetic acid, (c) contrast agents for use in conjunction with ultrasound imaging, including organic and inorganic echogenic particles (i.e., particles that result in an increase in the reflected ultrasonic energy) or organic and inorganic echolucent particles (i.e., particles that result in a decrease in the reflected ultrasonic energy), (d) contrast agents for use in connection with x-ray fluoroscopy, including metals and metal compounds (e.g., metal salts, metal oxides, etc.), for instance, barium compounds, bismuth compounds and tungsten, among others, and iodinated compounds, among others, (e) radiocontrast agents, such as those based on the clinically important isotope $^{99m}Tc$, as well as other gamma emitters such as $^{123}I$, $^{125}I$, $^{131}I$, $^{111}In$, $^{57}Co$, $^{153}Sm$, $^{133}Xe$, $^{51}Cr$, $^{81m}Kr$, $^{201}Tl$, $^{67}Ga$, and $^{75}Se$, among others, (f) positron emitters, such as $^{18}F$, $^{11}C$, $^{13}N$, $^{18}O$, and $^{68}Ga$, among others, may be employed to yield functionalized radiotracer coatings, and (g) contrast agents for use in connection with near-infrared (NIR) imaging, which can be selected to impart near-infrared fluorescence to the coatings of the present disclosure, allowing for deep tissue imaging and device marking, for instance, NIR-sensitive nanoparticles such as gold nanoshells, carbon nanotubes (e.g., nanotubes derivatized with hydroxyl or carboxyl groups, for instance, partially oxidized carbon nanotubes), dye-containing nanoparticles, such as dye-doped nanofibers and dye-encapsulating nanoparticles, and semiconductor quantum dots, among others. NIR-sensitive dyes include cyanine dyes, squaraines, phthalocyanines, porphyrin derivatives and borondipyrromethane (BODIPY) analogs, among others.

Compositions in accordance with the present disclosure include lubricious compositions for medical applications, compositions for therapeutic agent release (e.g., by including one or more therapeutic agents in a matrix of the crosslinked polymers, by using the crosslinked polymers to encapsulate one or more therapeutic agents, etc.), implants, which may be formed ex vivo or in vivo (e.g., compositions for use as tissue markers, compositions that act as spacers to reduce side effects of off-target radiation therapy, cosmetic compositions, etc.).

What is claimed is:

1. A system comprising (a) a first composition comprising a multi-arm polymer comprising a core, a plurality of polymer segments having a first end that is covalently attached to the core and a second end comprising a moiety that comprises a reactive group, (b) a second composition comprising a multifunctional compound that comprises functional groups that are reactive with the reactive group of the multi-arm polymer, and (c) a delivery device that comprises a first reservoir containing the first composition and a second reservoir containing the second composition.

2. The system of claim 1, wherein the reactive group is selected from one of an electrophilic group and a nucleophilic group and wherein the functional groups are selected from the other of the electrophilic group and the nucleophilic group.

3. The system of claim 1, wherein the reactive group is an electrophilic group and the functional groups are nucleophilic groups.

4. The system of claim 3, wherein the nucleophilic groups are selected from amine groups and thiol groups.

5. The system of claim 3, wherein the second composition comprises a polyamine.

6. The system of claim 5, wherein the polyamine comprises three or more amine groups.

7. The system of claim 1, wherein the delivery device comprises a catheter.

8. The system of claim 7, wherein the catheter is a multi-lumen catheter.

9. The system of claim 8, wherein the device further comprises a mixing section having a first mixing section inlet in fluid communication with a distal end of a first lumen, a second mixing section inlet in fluid communication with a distal end of a second lumen, and a mixing section outlet.

10. A system comprising (a) a first composition comprising a multi-arm polymer comprising a core, a plurality of polymer segments having a first end that is covalently attached to the core and a second end comprising a moiety that comprises a reactive group, the polymer segments comprising one or more free-radical-polymerizable monomers, (b) a second composition comprising a multifunctional compound that comprises functional groups that are reactive with the reactive group of the multi-arm polymer, and (c) a delivery device that comprises a first reservoir containing the first composition and a second reservoir containing the second composition.

11. The system of claim 10, wherein the one or more unsaturated free-radical-polymerizable monomers comprise one or more hydrophilic, aprotic, unsaturated free-radical-polymerizable monomers.

12. The system of claim 10, wherein the core is a polyol residue core, wherein the reactive group is an electrophile, and wherein the second composition comprises a polyamine.

13. The system of claim 10, wherein the reactive group is selected from N-hydroxysuccinimide esters, imidazole esters, imidizole carboxylates and benzotriazole esters.

14. The system of claim 10, wherein the moiety that comprises a reactive group comprises a hydrolysable ester group.

15. The system of claim 10, wherein the moiety that comprises a reactive group comprises a hydrolysable diester.

16. The system of claim 10, wherein the device comprising a multi-lumen catheter.

17. The system of claim 10, wherein the device further comprises a mixing section having a first mixing section inlet in fluid communication with a distal end of a first lumen, a second mixing section inlet in fluid communication with a distal end of a second lumen, and a mixing section outlet.

* * * * *